UNITED STATES PATENT OFFICE.

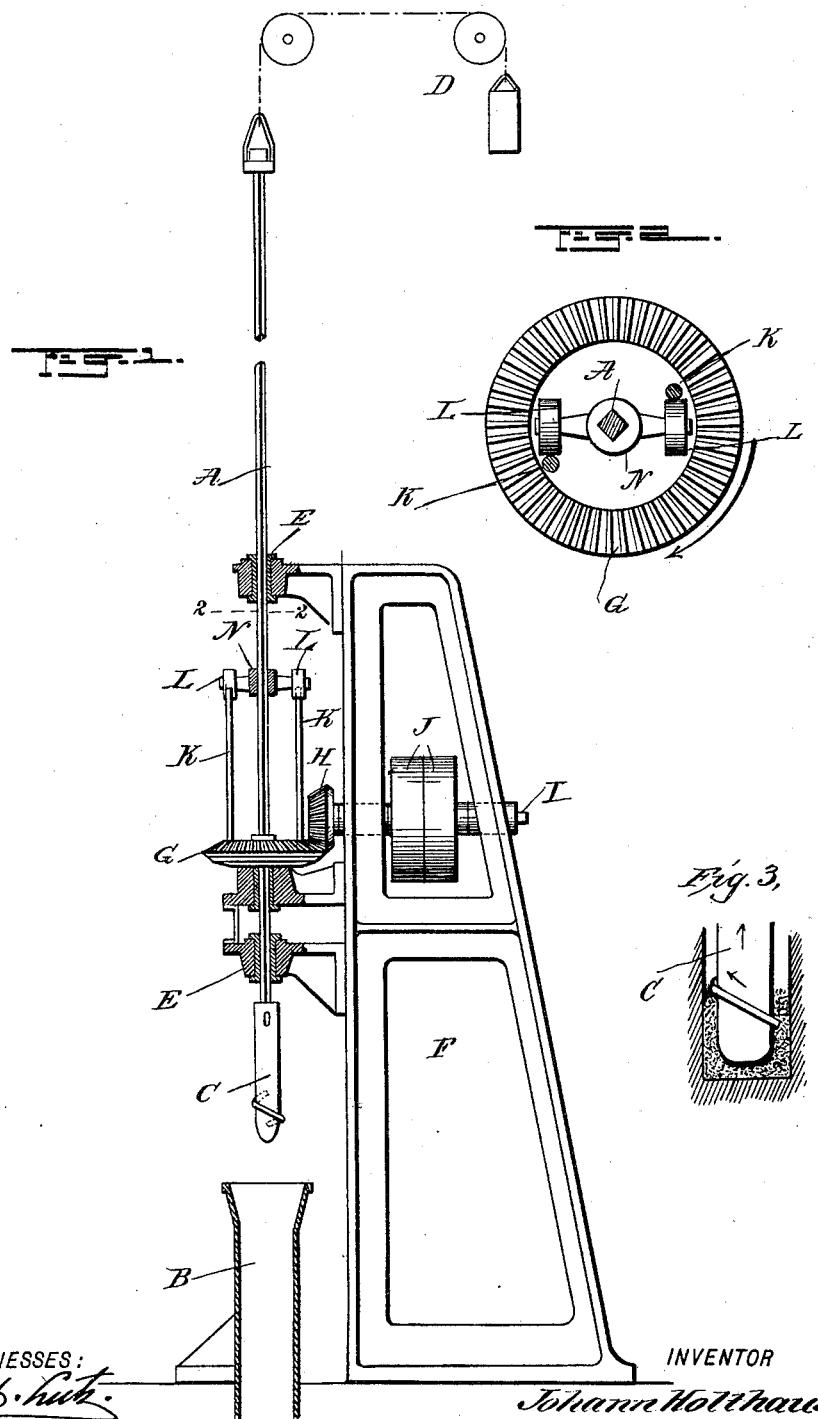

JOHANN HOLTHAUS, OF HÜLLEN, GERMANY, ASSIGNOR TO AKTIEN-GESELL-SCHAFT SCHALKER GRUBEN-UND HÜTTENVEREIN, OF GELSENKIRCHEN, GERMANY.

DRIVING DEVICE FOR SHAFTS.

SPECIFICATION forming part of Letters Patent No. 701,043, dated May 27, 1902.

Application filed October 12, 1901. Serial No. 78,449. (No model.)

*To all whom it may concern:*

Be it known that I, JOHANN HOLTHAUS, a subject of the King of Prussia, German Emperor, and a resident of Hüllen, in the Kingdom of Prussia, Germany, have invented a new and Improved Driving Device for Shafts, of which the following is a full, clear, and exact description.

The object of the invention is to provide a new and improved driving device, more especially designed for revoluble shafts having lengthwise vertical movement and arranged to prevent or reduce undesirable friction to a minimum and to allow any desired pressure to be exerted lengthwise of the shaft without interfering with the action of the driving device.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement as applied to a machine for molding pipes or tubes. Fig. 2 is an enlarged sectional plan view of the same on the line 2 2 of Fig. 1, and Fig. 3 is a detail view showing the former in the form.

In machines for forming tubular bodies and pressing the sand firm by screw-faces it is necessary to employ vertically slidable and revoluble shafts. The compound movement of the shaft requires that a driving device for rotating the shaft should allow the latter to move lengthwise. The driving devices heretofore constructed for the purpose mentioned not only produce an undesirable friction which could not be eliminated by lubricants, as the latter would be liable to come in contact with the sand, and thereby render the same useless for its legitimate purpose, but, furthermore, pressure exerted on the shaft for molding purposes should not be influenced by driving mechanism for obtaining the desired result. With my improvement, presently to be described in detail, the shaft is properly rotated and is free to slide upward without being influenced by undue friction on the part of the driving device.

The shaft A is moved upwardly by the action of the sand filled into the form B and rammed tight therein by the former C, secured to the lower end of the shaft A and provided with a spiral cam $c$. A counterbalancing device D, of any approved construction, is preferably connected with the upper end of the shaft A, as shown in Fig. 1. The shaft A is preferably polygonal in cross-section and is mounted to turn with and slide in bearings E, carried by and mounted to turn on a suitable frame F, having a bearing F', through which passes loosely the shaft A. On this bearing F' is mounted to rotate the bevel gear-wheel G in mesh with a bevel-pinion H, secured on a shaft I, journaled in suitable bearings in the frame F, and on the said shaft I are arranged the fast and loose pulleys J, connected by a belt with other machinery for imparting a rotary motion to the shaft I to revolve the pinion H and the gear-wheel G. On the latter are secured the upwardly-extending rods K, arranged parallel to the shaft A, and on the said rods are adapted to travel the friction-rollers L, journaled on the ends of an arm N, mounted to turn with and to slide vertically on the shaft A.

The operation is as follows: When the arm N rests on the upper face of the bevel-gear G and a rotary motion is given to the shaft I to rotate the bevel gear-wheel G, as previously explained, and the shaft A is moved upwardly by the action of the sand in the mold B, the rods K move in contact with the friction-rollers L to cause the arm N to travel around, and thereby rotate the shaft A. As the shaft A is moved upward the arm N moves with it, and the friction-rollers L then travel upward on the rods K, and when the friction-rollers L have finally reached the upper end of the said rods and pass over the same the arm N immediately drops by its own weight back to its former position on the upper face of the wheel G to be again turned around by the action of the rods K on the friction-rollers L. If the shaft A still receives an upward movement by the action of the sand in the mold B, the above-described operation is repeated—that is, the shaft A is revolved by the action of the rods K on the friction-rollers L, carried by the arm N, mounted to turn with and to slide freely on the shaft A. It is understood that when the rods K engage the friction-rollers L the arm N is pressed with such force on the shaft A that the arm moves upward with the shaft until the friction-rollers L leave the rods at the upper ends thereof. Thus by the arrangement described the shaft A can be repeatedly driven by the arm $n$ during its upward movement without unnecessarily increasing the length of the rods K. When the sand has been filled in, the former C is turned, and its spiral cam $c$ compresses the sand underneath, the action of the cam being somewhat similar to that of a screw-propeller. The counterweight D is for determining the desired pressure. After the outer tube-mold is ready in compressed sand a core of clay is inserted and the tube is cast.

Having thus described my invention, I claim as new and desire to secure by Letters Patent—

1. A driving device, comprising a shaft, a driver-arm mounted to slide on and to turn with the shaft, friction-rollers journaled on the driver-arm, a revoluble driven wheel concentric with the shaft but independent thereof, and rods on the said wheel and adapted to engage the said friction-rollers, as set forth.

2. A driving device, comprising a shaft, a driver-arm mounted to slide on and to turn with the shaft, friction-rollers journaled on the said driver-arm, a revoluble driven wheel concentric with the shaft but independent thereof, means for driving the said revoluble wheel, and rods on the said wheel and adapted to engage the said friction-rollers to carry the driver-arm along and thereby rotate the shaft until the friction-rollers leave the upper ends of the rods, as set forth.

3. A driving device comprising a shaft, a revoluble gear-wheel, an angular shaft extending through said gear-wheel and free to slide endwise, a pair of longitudinal members rigidly secured upon said gear-wheel and revoluble therewith, a sleeve fixed upon said angular shaft, a pair of rollers connected with said sleeve and free to engage said longitudinal members, and means for actuating said gear-wheel.

In testimony whereof I have signed my name to this specification in the presence of two witnesses.

JOHANN HOLTHAUS.

Witnesses:
WILLIAM ESSENWEIN,
OSCAR SCHULTZ.